United States Patent
Eriksson et al.

(10) Patent No.: US 10,349,464 B2
(45) Date of Patent: Jul. 9, 2019

(54) USER EQUIPMENT, AND METHOD IN THE USER EQUIPMENT, FOR MONITORING A DOWNLINK CONTROL CHANNEL

(71) Applicant: Telefonaktiebolaget L M Ericsson (publ), Stockholm (SE)

(72) Inventors: Erik Eriksson, Linköping (SE); Riikka Susitaival, Helsinki (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 214 days.

(21) Appl. No.: 14/779,284

(22) PCT Filed: Mar. 31, 2014

(86) PCT No.: PCT/SE2014/050384
§ 371 (c)(1),
(2) Date: Sep. 22, 2015

(87) PCT Pub. No.: WO2014/168552
PCT Pub. Date: Oct. 16, 2014

(65) Prior Publication Data
US 2016/0057805 A1 Feb. 25, 2016

Related U.S. Application Data

(60) Provisional application No. 61/811,284, filed on Apr. 12, 2013.

(51) Int. Cl.
*H04L 5/14* (2006.01)
*H04W 52/02* (2009.01)
(Continued)

(52) U.S. Cl.
CPC .......... *H04W 76/28* (2018.02); *H04B 17/391* (2015.01); *H04L 5/1469* (2013.01);
(Continued)

(58) Field of Classification Search
CPC ........... H04W 52/0209; H04W 76/048; H04W 72/1273; H04W 72/0446; H04W 72/10; H04B 17/391; H04L 5/1469
See application file for complete search history.

(56) References Cited

U.S. PATENT DOCUMENTS

2011/0176461 A1 7/2011 Astely et al.
2012/0320806 A1 12/2012 Ji et al.
(Continued)

FOREIGN PATENT DOCUMENTS

EP 3169100 A1 5/2017
RU 2298150 C2 4/2007
(Continued)

OTHER PUBLICATIONS

Alcatel-Lucent et al., "R2-122735: DRX operation in inter-band TDD CA," 3rd Generation Partnership Project (3GPP), TSG-RAN WG2#77bis, May 21-25, 2012, 9 pages, Prague, Czech Republic.
(Continued)

*Primary Examiner* — Redentor Pasia
(74) *Attorney, Agent, or Firm* — Withrow & Terranova, PLLC

(57) ABSTRACT

A method in a UE for deciding whether to monitor a downlink control channel in a subframe is provided. The UE operates with discontinuous reception, DRX and dynamic time division duplex, TDD. The UE is in an active state of a DRX cycle. The UE determines that the subframe is a fixed downlink subframe or that the subframe is a flexible subframe currently configured to operate as a downlink subframe. Upon determining that the subframe is a fixed downlink subframe, the UE updates a first DRX timer. Upon determining that the subframe is a fixed downlink subframe or that the subframe is a flexible subframe currently con-
(Continued)

figured to operate as a downlink subframe, the UE decides, to monitor the downlink control channel in the subframe.

10 Claims, 14 Drawing Sheets

(51) Int. Cl.
  *H04W 52/44* (2009.01)
  *H04W 72/12* (2009.01)
  *H04W 76/28* (2018.01)
  *H04B 17/391* (2015.01)
(52) U.S. Cl.
  CPC ... *H04W 52/0209* (2013.01); *H04W 72/1273* (2013.01); *H04W 52/44* (2013.01)

(56) References Cited

U.S. PATENT DOCUMENTS

| | | | | |
|---|---|---|---|---|
| 2013/0188533 A1* | 7/2013 | He | ............... | H04J 3/1605 370/280 |
| 2013/0301490 A1* | 11/2013 | He | ............... | H04W 4/90 370/280 |
| 2015/0250017 A1* | 9/2015 | Ingale | ............... | H04B 7/2615 370/280 |
| 2015/0365968 A1* | 12/2015 | Kim | ............... | H04B 7/2656 370/280 |
| 2017/0026944 A1* | 1/2017 | Li | ............... | H04L 5/1469 |

FOREIGN PATENT DOCUMENTS

| | | |
|---|---|---|
| WO | 2012138149 A2 | 10/2012 |
| WO | 2014007595 A1 | 1/2014 |

OTHER PUBLICATIONS

Author Unknown, Technical Specification Group Radio Access Network; Evolved Universal Terrestrial Radio Access (E-UTRA); Medium Access Control (MAC) protocol specification (Release 11); Technical Specification 36.321, Version 11.2.0, 3GPP Organizational Partners, Mar. 2013, 56 pages.

Ericsson et al., "R1-131458: On efficient signaling of Dynamic TDD," 3rd Generation Partnership Project (3GPP), TSG-RAN WG1 #72bis, Apr. 15-19, 2013, 4 pages, Chicago, U.S.A.

Ericsson, "R2-134133: DRX for dynamic TDD operation," 3rd Generation Partnership Project (3GPP), TSG-RAN WG2 #84, Nov. 11-15, 2013, 3 pages, San Francisco, USA.

International Search Report and Written Opinion for International Patent Application No. PCT/SE2014/050384, dated Oct. 16, 2014, 12 pages.

Written Opinion for International Patent Application No. PCT/SE2014/050384, dated Apr. 27, 2015, 10 pages.

International Preliminary Report on Patentability for International Patent Application No. PCT/SE2014/050384, completed on Jul. 27, 2015, 10 pages.

Office Action and Search Report for Russian Patent Application No. 2015148537, dated Oct. 25, 2016, 12 pages.

Examination Report for European Patent Application No. 14719378. 3, dated May 20, 2019, 5 pages.

* cited by examiner

USER EQUIPMENT, AND METHOD IN THE USER EQUIPMENT, FOR MONITORING A DOWNLINK CONTROL CHANNEL

This application is a 35 U.S.C. § 371 national phase filing of International Application No. PCT/SE2014/050384, filed Mar. 31, 2014, which claims the benefit of U.S. Provisional Application No. 61/811,284, filed Apr. 12, 2013, the disclosures of which are incorporated herein by reference in their entireties.

TECHNICAL FIELD

Embodiments herein relate to a user equipment and to methods in the user equipment. In particular, they relate to deciding whether to monitor a downlink control channel in a subframe.

BACKGROUND

In a typical cellular radio system, wireless terminals, which are also known as mobile stations and/or user equipments (UEs), communicate via a radio access network (RAN) to one or more core networks. The radio access network (RAN) covers a geographical area which is divided into cell areas, with each cell area being served by a base station, e.g., a radio base station (RBS), which in some networks may also be called, for example, a NodeB, as in the case of an Universal Mobile Telecommunications System (UMTS) network, or an Evolved Universal Terrestrial Radio Access Network (E-UTRAN) Node B (eNodeB,), as in the case of a Long Term Evolution (LTE) network. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations. In some radio access networks, several base stations are typically connected, e.g., by landlines or microwave, to a controller node, such as a Radio Network Controller (RNC) or a Base Station Controller (BSC), which supervises and coordinates various activities of the plural base stations connected thereto. The radio network controllers are typically connected to one or more core networks. LTE is a variant of a 3rd Generation Partnership Project (3GPP) radio access technology where the radio base station nodes are connected to a core network, via Access Gateways (AGWs), rather than to radio network controller (RNC) nodes. In general, in LTE the functions of a RNC node are distributed between the radio base stations nodes, such as eNodeBs in LTE, and AGWs.

Discontinuous Reception (DRX) is used to save UE battery by providing a UE sleep-times where a UE does not need to monitor the downlink. However, for each DRX cycle, there is an active period during which the UE is active and monitors a number of downlink subframes such as Physical DownLink Control Channel (PDCCH) subframes as specified in 3GPP TS 36.321, Release 11, section 5.7.

Transmission and reception from a node, e.g., a radio terminal like a UE in a cellular system such as e.g. LTE, is multiplexed in the frequency domain or in the time domain, or combinations thereof. In Frequency Division Duplex (FDD), as illustrated to the left in FIG. 1, downlink and uplink transmission take place in different, sufficiently separated, frequency bands. In Time Division Duplex (TDD), as illustrated to the right in FIG. 1, downlink and uplink transmission take place in different, non-overlapping time slots. Thus, TDD operates in unpaired frequency spectrum, whereas FDD requires paired frequency spectrum.

TDD allows for different asymmetries in terms of the amount of resources allocated for uplink and downlink transmission, respectively, using different downlink/uplink configurations. In LTE, there are seven different configurations. Some TDD networks use a fixed frame configuration where some subframes are fixed as uplink and some are fixed as downlink. This prevents or at least limits the flexibility to adapt the uplink/downlink resource asymmetry to varying traffic situations. Recently, flexible subframes have been introduced so that three different types of subframes in a TDD system may be configured: a DownLink (DL) subframe, an UpLink (UL) subframe, and a "flexible" subframe. A frame structure may then include one or more downlink subframes preconfigured as a downlink subframe, one or more uplink subframes preconfigured as an uplink subframe, and one or more flexible subframes, where a flexible subframe is dynamically allocated to be an uplink subframe in one instance of a frame and a downlink subframe in another frame instance. This dynamic quality of the TDD frame is sometimes referred to as "dynamic TDD."

For TDD with uplink and downlink subframe adaptation, i.e. dynamic TDD, a flexible subframe may be either uplink or downlink.

SUMMARY

It is an object of embodiments herein to enhance the performance in a wireless communications network in which a UE operates with discontinuous reception, DRX and dynamic time division duplex, TDD. A further objective of embodiments herein is to reduce the UE's power consumption.

According to a first aspect of embodiments herein, the object is achieved by a method in a UE for deciding whether to monitor a downlink control channel in a subframe. The UE operates with discontinuous reception, DRX and dynamic time division duplex, TDD. The UE is in an active state of a DRX cycle. The UE determines that the subframe is a fixed downlink subframe or that the subframe is a flexible subframe currently configured to operate as a downlink subframe. Upon determining that the subframe is a fixed downlink subframe, the UE updates a first DRX timer. Upon determining that the subframe is a fixed downlink subframe or that the subframe is a flexible subframe currently configured to operate as a downlink subframe, the UE decides, to monitor the downlink control channel in the subframe.

According to a second aspect of embodiments herein, the object is achieved by a UE for deciding whether to monitor a downlink control channel in a subframe, The UE operates with discontinuous reception, DRX and dynamic time division duplex, TDD. The UE is in an active state of a DRX cycle. The UE is configured to determine that the subframe is a fixed downlink subframe or that the subframe is a flexible subframe currently configured to operate as a downlink subframe. The UE is further configured to update a first DRX timer, upon determining that the subframe is a fixed downlink subframe. The UE is further configured to decide to monitor the downlink control channel in the subframe, upon determining that the subframe is a fixed downlink subframe or that the subframe is a flexible subframe currently configured to operate as a downlink subframe.

By means of providing a decision procedure depending on a determination of a subframe configuration is made, a well-defined DRX behavior for UEs operating with reconfigurable and/or dynamic TDD is achieved. The UE will monitor the downlink control channel for subframes fulfilling the conditions defined in the decision procedure, and may enter a sleep mode for other subframes.

The fact that the UE will monitor the downlink control channel for subframes fulfilling the conditions defined in the decision procedure, and enters a sleep mode for other subframes also implies that an energy efficient way of operating a UE in dynamic TDD is provided, which improves the UE's battery lifetime.

The updating of a first DRX timer facilitates reaching a predetermined time out value, and thus providing a state-update known in both the UE and the base station.

BRIEF DESCRIPTION OF THE DRAWINGS

Examples of embodiments herein are described in more detail with reference to attached drawings in which.

Figure 1:
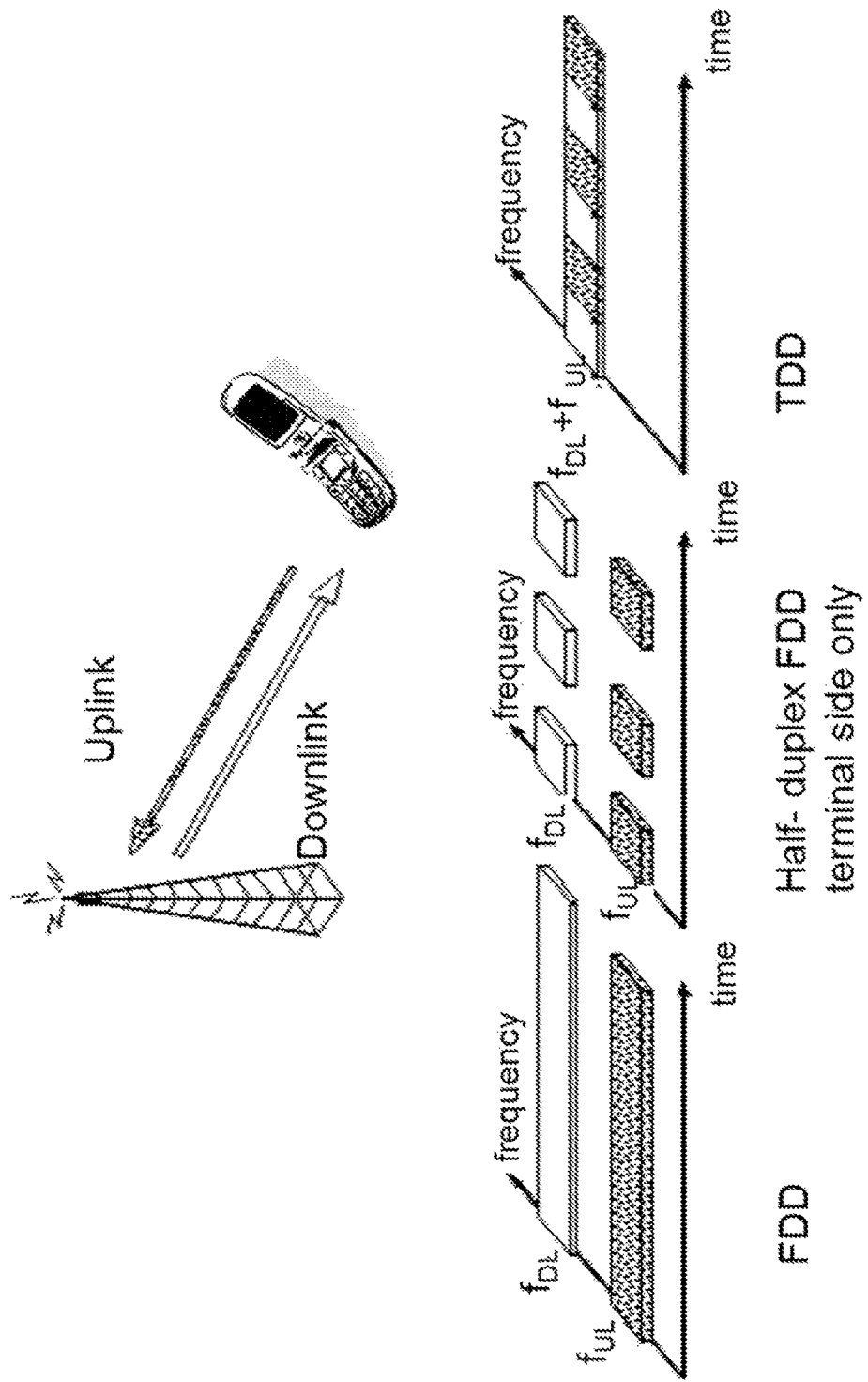
FIG. 1 illustrates frequency division duplex, half-duplex frequency division, and time division duplex transmissions.

The foregoing and other objects, features, and advantages of the technology disclosed herein will be apparent from the following more particular description of example non-limiting embodiments as illustrated in the drawings in which reference characters refer to the same parts throughout the various views. The drawings are not necessarily to scale, emphasis instead being placed upon illustrating the principles of the technology disclosed herein.

DETAILED DESCRIPTION

As part of developing embodiments herein, some problems will first be identified and discussed.

As mentioned above, DRX is used to save UE battery by providing the UE sleep-times where a UE does not need to monitor the downlink. However, for each DRX cycle, there is an period during which the UE is active and monitors a number of downlink subframes such as PDCCH subframes as specified in 3GPP TS 36.321. This active period is referred to as DRX Active Time. DRX in an RRC_CONNECTED state is described in Section 5.7 of 3GPP TS 36.321, Release 11.2.0. In the RRC_CONNECTED state, the UE is known on a cell level but does not necessarily have an UL grant or a DL assignment. The UE may have UE-specific DRX settings. A Radio Resource Control (RRC) protocol activates the DRX mechanism of a given UE and defines the start of a DRX cycle by configuring an offset value. The RRC protocol also configures DRX cycle length, which may be long or short, a DRX inactivity timer, an Hybrid Automatic Repeat Request (HARQ) round trip time (RTT) timer, and a DRX retransmission timer. The DRX timers are referred to as timers in the 3GPP standard, but are typically implemented as counters to selectively count subframes up or down to a timeout value. The UE monitors the PDCCH during a DRX Active Time but otherwise is allowed to sleep. Regardless of the DRX Active time, the UE transmits or receives HARQ feedback when expected.

Figure 2:
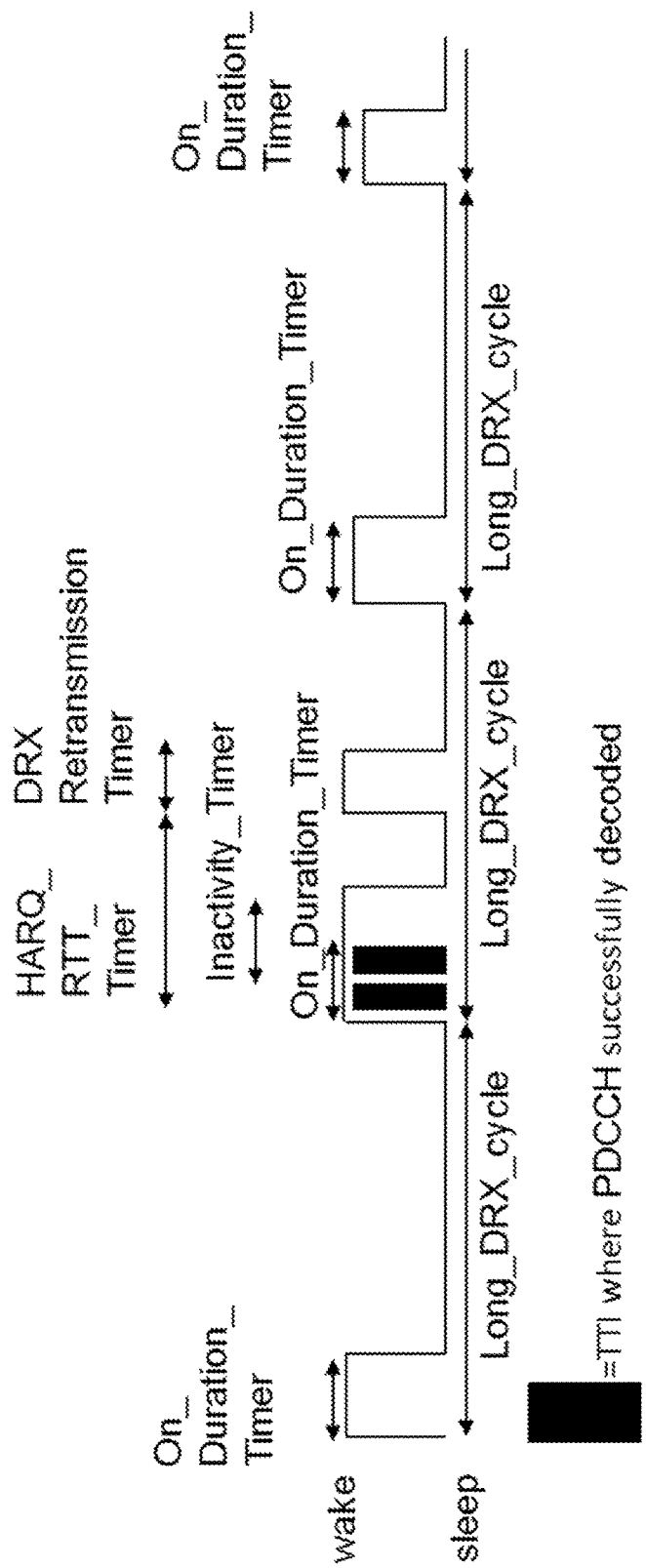
FIG. 2 shows an example of DRX Active Time and DRX Active Time timers.

Referring to FIG. 2, the DRX Active Time during which the UE must monitor the PDCCH includes the time when any one of the following conditions is fulfilled:

When an OnDurationTimer is running. In the beginning of each DRX cycle, the OnDurationTimer defines how long the UE should monitor PDCCH and be active. There are two types of cycles, long and short. Short cycles are followed only when there has recently been activity, otherwise, long cycles are used.

When a drx-InactivityTimer is running. When the PDCCH indicates a new transmission in the DL or UL, i.e., a DL assignment or an UL grant, an InactivityTimer is started/restarted.

When a Scheduling Request is pending. After sending a scheduling request, the UE expects the eNodeB to schedule the UE for transmission and send an UL grant to the UE on the PDCCH.

When a drx-RetransmissionTimer is running. In the DL, retransmissions are asynchronous and do not always need to be done one HARQ RTT after the previous transmission, as is typically done in the uplink. Thus, when the UE receives a DL transmission, it starts a DL HARQ RTT Timer for the current HARQ process. When this timer expires, the drx-RetransmissionTimer of the HARQ process is started, and the UE monitors the PDCCH for incoming assignments. The drx-RetransmissionTimer starts only when the UE has not been able to decode the DL data, and thus, has sent a negative acknowledgement in the uplink When an uplink grant for a retransmission may occur. In LTE, the eNodeB may send a new UL resource allocation together with the HARQ feedback to be used for the retransmission. During this subframe in LTE, 4 ms after the initial UL transmission, the UE should not only monitor the PDCCH for uplink grants but also the Physical Hybrid Automatic Repeat Request Indicator Channel (PHICH) for HARQ feedback.

When an UL grant is expected after receiving a Random Access Response, or when the Contention resolution timer is running.

3GPP TS 36.321 specifies that when counting DRX timers, e.g., the OnDurationTimer, drx-InactivityTimer and drx-RetransmissionTimer, the PDCCH subframe is taken into account. In TS 36.321 Release 11.2.0, the PDCCH subframe is specified as either a normal DL subframe or a special subframe including a downlink part, DownLink Pilot Time Slot (DwPTS) in TDD mode described below. A UL subframe cannot be a PDCCH subframe, which is a DL subframe. In addition, for carrier aggregation situations with different TDD configurations, a PDCCH subframe is considered a union over the PDCCH subframes of each component carrier.

On the other hand, the DRX Section 5.7 of TS 36.321 v11.2.0 specifies that the UE should monitor the PDCCH when the UE is Active, the current subframe is a PDCCH subframe, the subframe is not part of a measurement gap, and when the subframe is not used for uplink transmission for a half-duplex UE.

As mentioned above, transmission and reception from a node, e.g., a radio terminal like a UE in a cellular system such as LTE, may be multiplexed in the frequency domain or in the time domain, or combinations thereof. In FDD as illustrated to the left in FIG. 1, downlink and uplink transmission take place in different, sufficiently separated, frequency bands. In TDD as illustrated to the right in FIG. 1, downlink and uplink transmission take place in different, non-overlapping time slots. Thus, TDD may operate in unpaired frequency spectrum, whereas FDD requires paired frequency spectrum.

Figure 3:
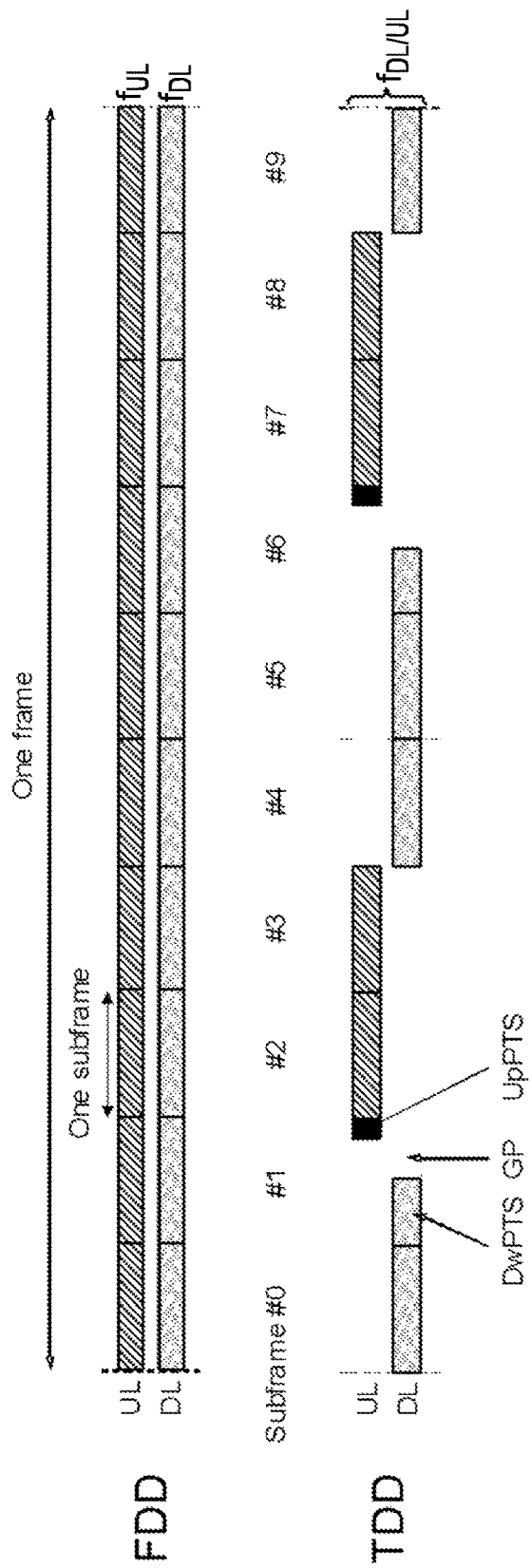
FIG. 3 illustrates uplink/downlink time/frequency structure for LTE separately in the case of frequency division duplex (FDD) and time division duplex (TDD).

Typically, a transmitted signal in a communication system is organized in some form of frame structure. For example, LTE uses ten equally-sized subframes 0-9 of length 1 ms per radio frame as illustrated in FIG. 3. In the case of FDD operation, illustrated in the upper part of FIG. 3, there are two carrier frequencies, one for uplink transmission (fUL) and one for downlink transmission (fDL). In the case of TDD operation, illustrated in the lower part of FIG. 3, there is only a single carrier frequency, and uplink and downlink transmissions are separated in time and also on a cell basis. Because the same carrier frequency is used for uplink and downlink transmission, both the base station and the mobile terminals need to switch from transmission to reception and vice versa. An important aspect of a TDD system is to provide a sufficiently large guard time where neither downlink nor uplink transmissions occur in order to avoid interference between uplink and downlink transmissions.

For LTE, special subframes, such as subframe 1 and, in some cases, subframe 6, as illustrated in FIG. 3. provide this guard time. A TDD special subframe is split into three parts: a downlink part—DownLink Pilot Time Slot (DwPTS), a Guard Period (GP), and an uplink part—Uplink Pilot Time Slot (UpPTS). The remaining subframes are either allocated to uplink or downlink transmission.

As mentioned above, TDD allows for different asymmetries in terms of the amount of resources allocated for uplink and downlink transmission, respectively, using different downlink/uplink configurations. In LTE, there are seven different configurations. Some TDD networks use a fixed frame configuration where some subframes are fixed as uplink and some are fixed as downlink. This prevents or at least limits the flexibility to adapt the UL/DL resource asymmetry to varying traffic situations. Recently, flexible subframes have been introduced so that three different types of subframes in a TDD system may be configured: a DL subframe, an UL subframe, and a "flexible" subframe. A frame structure may then include one or more downlink subframes preconfigured as a downlink subframe, one or more uplink subframes preconfigured as an uplink subframe, and one or more flexible subframes, where a flexible subframe is dynamically allocated to be an uplink subframe in one instance of a frame and a downlink subframe in another frame instance. This dynamic quality of the TDD frame is sometimes referred to as "dynamic TDD."

Figure 4:
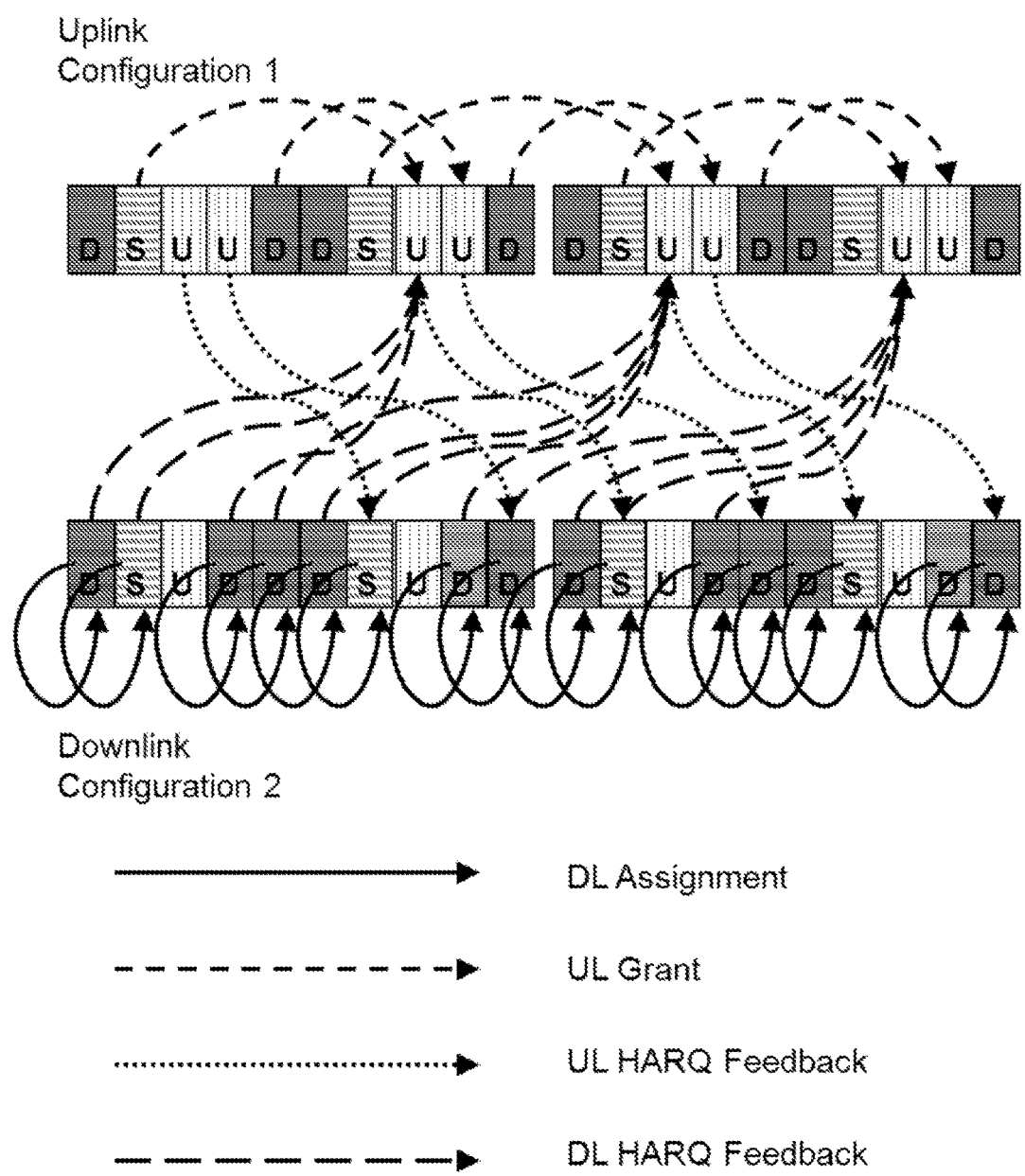
FIG. 4 illustrates examples of dynamic TDD subframes.

FIG. 4 illustrates an example of dynamic TDD where the system may switch between configuration 1 and configuration 2, where D=a DL subframe, S=a special subframe, and U=an UL subframe. In this example, subframes {0, 1, 4, 5, 6, 9} are downlink subframes, subframes {2, 7} are uplink subframes, and subframes {3, 8} are flexible subframes. A special subframe is typically regarded as a fixed downlink subframe.

Figure 5:
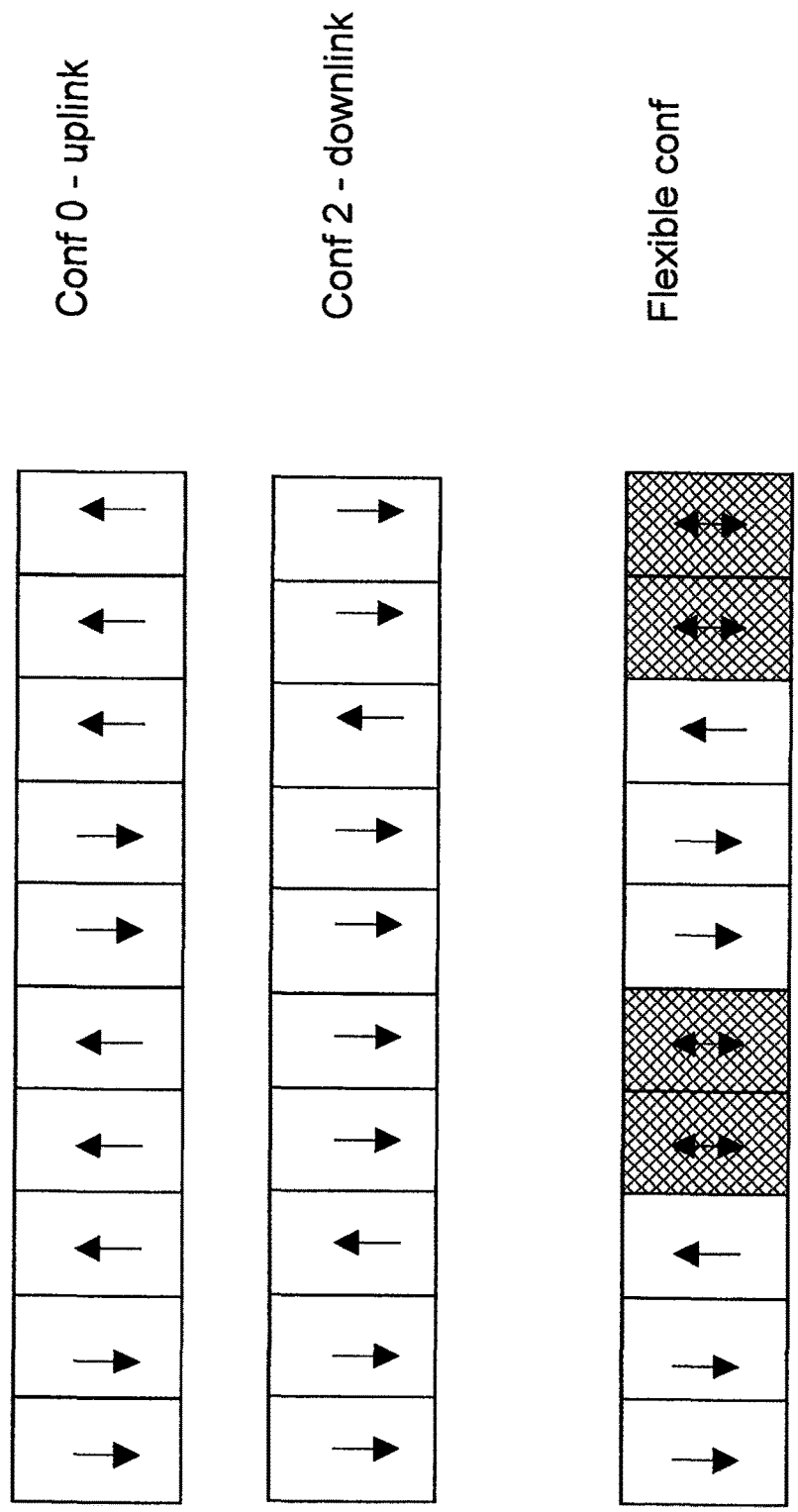
FIG. 5 illustrates examples of dynamic TDD subframes.

FIG. 5 shows two fixed subframe configurations 0 and 2 and one flexible configuration in which the cross-hatched subframes may be configured to be either an UL subframe or a DL subframe.

Any suitable signaling scheme may be used to communicate which subframes are fixed downlink and uplink subframes and which subframes are flexible subframes. For example, scheduling assignments/grants or explicit signaling, may be used, e.g., to change the subframe configuration in System Information Block 1 (SIB1) to a different configuration. In this latter example, subframes with a different direction as compared to the SIB1 configuration would be seen as flexible.

Accordingly, for TDD with uplink and downlink subframe adaptation, i.e., dynamic TDD, a flexible subframe may be either uplink or downlink. This introduces ambiguity in the DRX process because the UE may be uncertain whether it should consider a flexible subframe a downlink subframe or an uplink subframe, and if a downlink subframe, whether the UE should monitor the PDCCH. This ambiguity may lead to misalignment of the DRX cycles between the UE and the base station resulting in missed downlink messages and increased UE power consumption and potential call drop.

Figure 6:
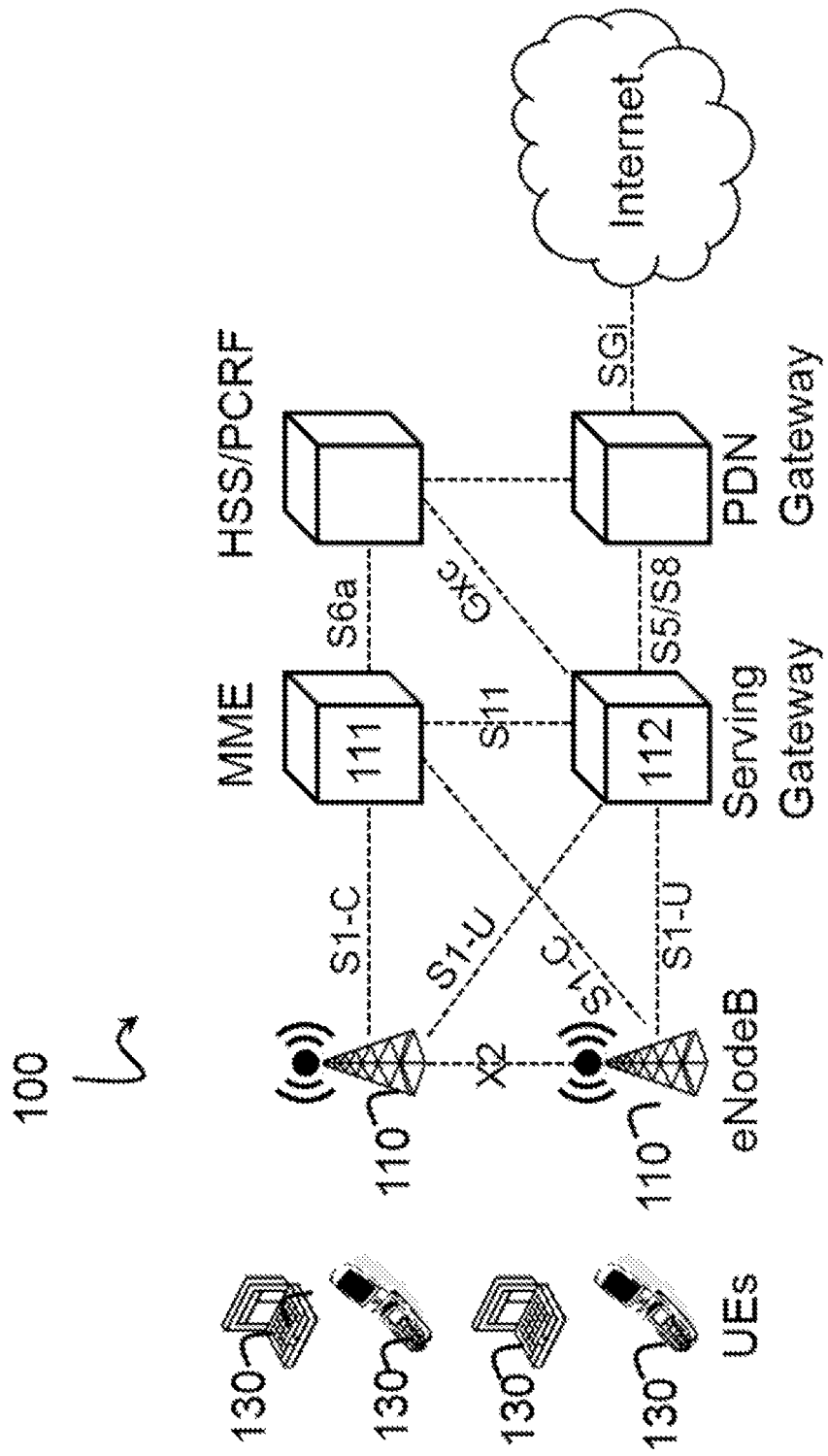
FIG. 6 is a diagrammatic view of a Long Term Evolution (LTE) radio communications system.

FIG. 6 depicts an example of a wireless communications network 100 in which embodiments herein may be implemented. The wireless communications network 100 may be an LTE network, which may also be referred to as an LTE system.

In FIG. 6, the wireless communications network 100 is an LTE system 100. The LTE system uses a a 3GPP radio access technology where radio base station nodes (eNodeBs) 110 are connected to a core network via Access Gateways (AGWs) 111, 112 such as a Mobility Management Entity (MME) 111 and a Serving Gateway (S-GW) 112 rather than to Radio Network Controller (RNC) nodes. In general, in LTE the functions of a radio network controller (RNC) node are distributed between the radio base (eNodeBs 110 and AGWs 111, 112. As such, a Radio Access Network (RAN) of an LTE system has a flat architecture comprising radio base station nodes without reporting to RNC nodes. The following example embodiments are described in the context of an LTE system for illustration purposes only.

The Universal Mobile Telecommunications System (UMTS) is a third-generation mobile communication system, which evolved from the second generation (2G) Global System for Mobile Communications (GSM). UTRAN is essentially a radio access network using wideband code-division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. The 3GPP has developed specifications for the Evolved Universal Terrestrial Radio Access Network (E-UTRAN). The Evolved Universal Terrestrial Radio Access Network (E-UTRAN) comprises the Long-Term Evolution (LTE) and System Architecture Evolution (SAE).

One or several UEs 130 operate in the wireless communications network 100, as illustrated in FIG. 6.

Figure 7:
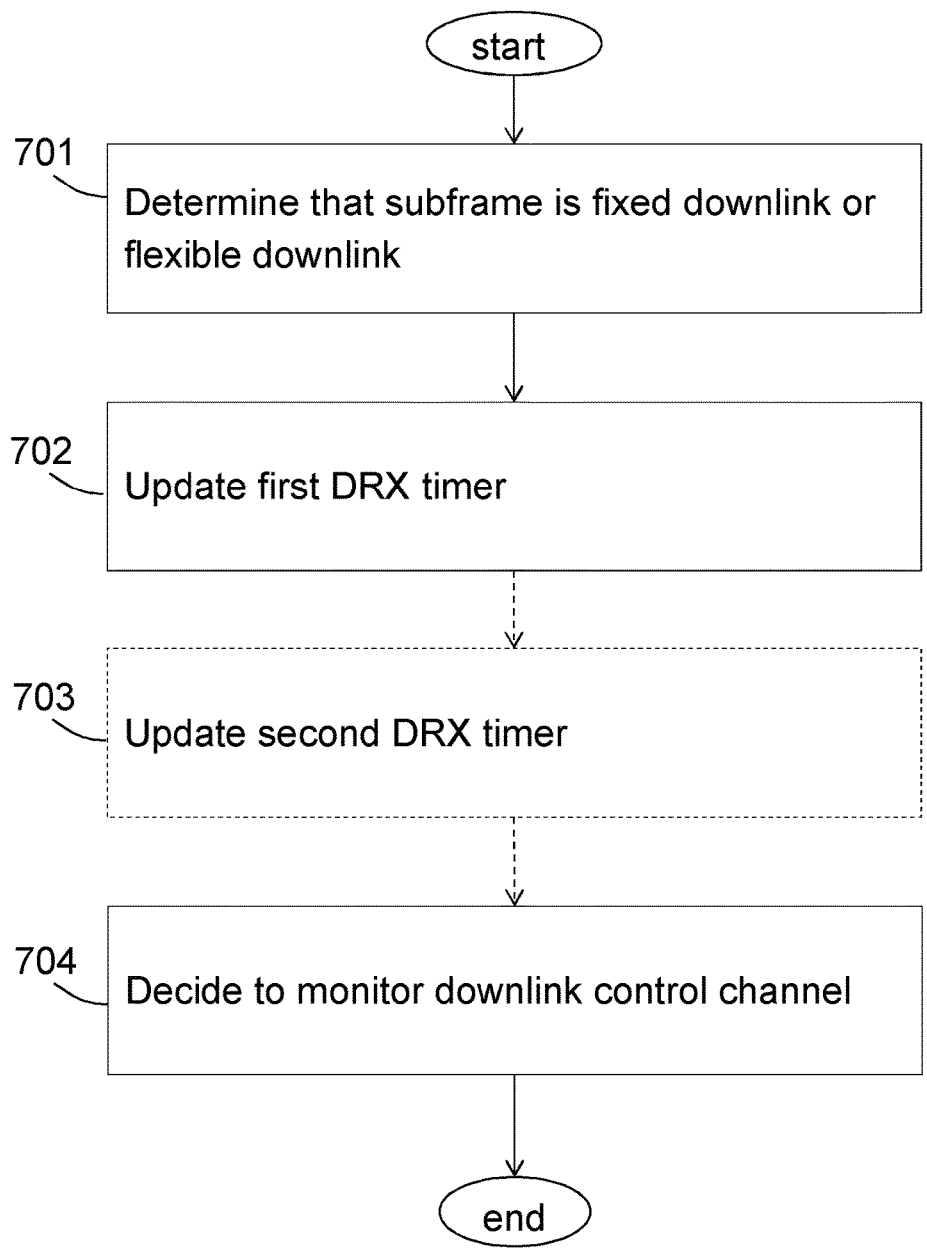
FIG. 7 is a is a flowchart depicting embodiments of a method in a UE.

Example embodiments of a method in a UE 130 for deciding whether to monitor a downlink control channel in a subframe, will now be described with reference to a flowchart depicted in FIG. 7. The method comprises the following actions, which actions may be taken in any suitable order. Dashed lines of some boxes in FIG. 7 indicate that the corresponding action is not mandatory. First, the method is described in a general way, here as seen from the UE's 130 point of view, relating to FIG. 7. The method will then be described in more detail below.

Embodiments herein address scenarios in which the UE 130 operates with discontinuous reception, DRX and dynamic time division duplex, TDD. The UE 130 is in an active state of a DRX cycle.

Action 701

In order to be able to make an appropriate decision regarding downlink control channel monitoring for the actual subframe the UE 130 determines that the subframe is a fixed downlink subframe or that the subframe is a flexible subframe currently configured to operate as a downlink subframe.

In some embodiments the determining whether the subframe is a flexible subframe currently configured to operate as a downlink subframe comprises checking control signaling. The control signaling comprises a current configuration for the subframe.

Action 702

Upon determining that the subframe is a fixed downlink subframe, the UE 130 updates a first DRX timer. Then, there is no ambiguity in what subframes are fixed DL subframes, these subframes are signaled using system information broadcast and change slowly, if at all.

In some embodiments the first DRX timer is an On Duration Timer.

Action 703

In some embodiments the UE 130 further updates a second DRX timer upon determining that the subframe is a fixed downlink subframe or that the subframe is a flexible subframe currently configured to operate as a downlink subframe.

Then, if the subframe is a fixed downlink subframe, the first DRX timer as well as the second DRX timer will be updated.

In some embodiments the second DRX timer is a DRX Inactivity Timer. An InactivityTimer may be used when the user is scheduled, hence the current configuration is considered to be known.

Action 704

Upon determining that the subframe is a fixed downlink subframe or that the subframe is a flexible subframe currently configured to operate as a downlink subframe, the UE 130 decides to monitor the downlink control channel in the subframe. If the subframe is not a fixed downlink subframe or a flexible subframe currently configured to operate as a downlink subframe, the UE 130 may enter a sleep mode.

Figure 8A:
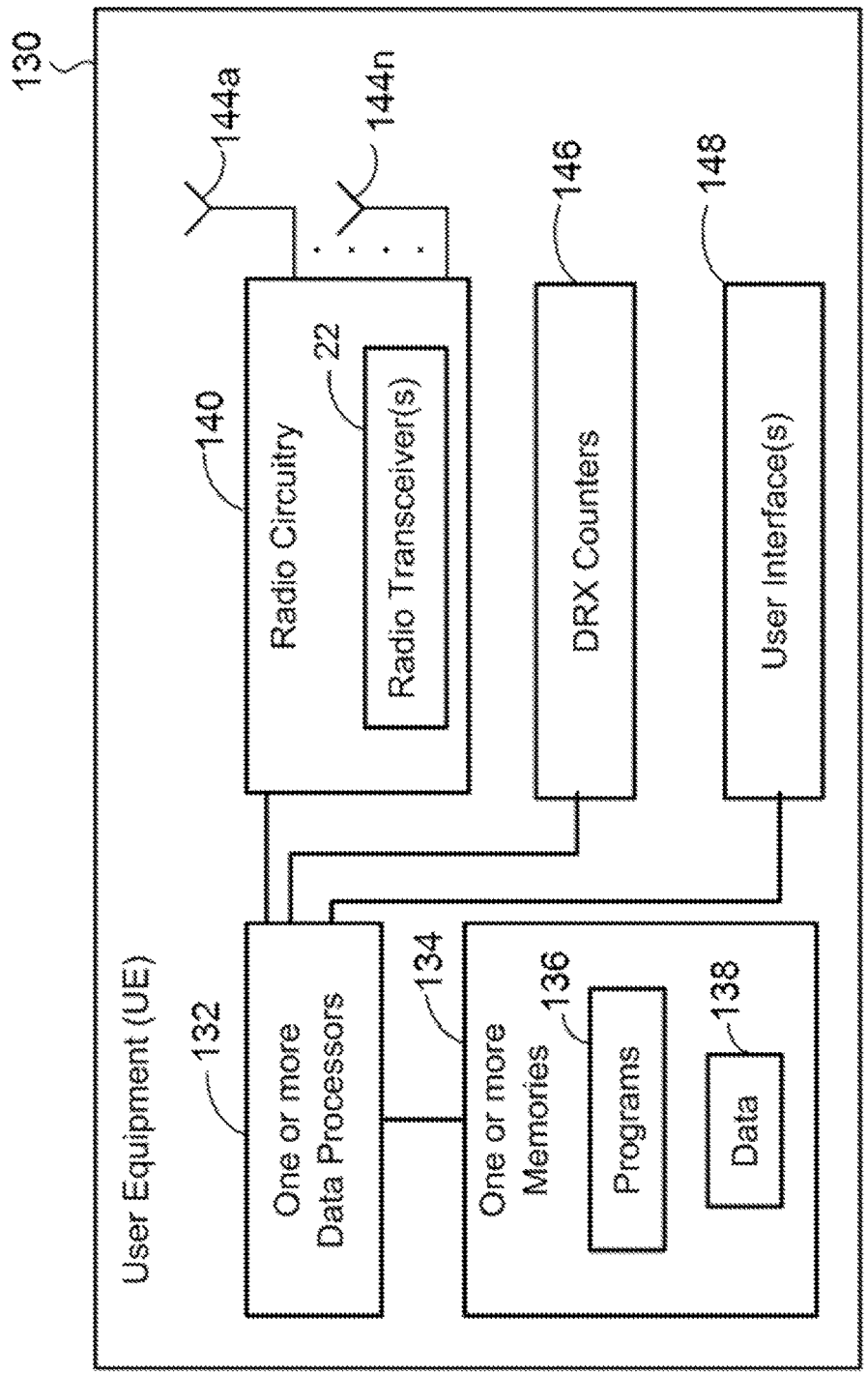
FIG. 8A is a non-limiting function block diagram of a UE for implementing the various example embodiments.

FIG. 8A shows an example function block diagram of a UE 130 for implementing the various example embodiments. The UE includes one or more data processors 132 coupled to one or more memories 134. The one or more memories 134 store computer programs 136 executable by the one or more processors 132 in accordance with procedures described herein. The one or more memories 134 also store data 138. Radio circuitry 140, coupled to the one or more processors, includes one or more radio transceivers 142 for transmitting and receiving over one or more antennas 144a . . . 144n. DRX counters 146, shown coupled to the processors 132 but may be implemented in the processors 132 or in the memory 134 or otherwise. The one or more processors control one or more user interfaces 148 including any suitable input and output devices, e.g., keyboards, keypads, displays, speakers, mics, etc. to interact with a user.

Figure 8B:
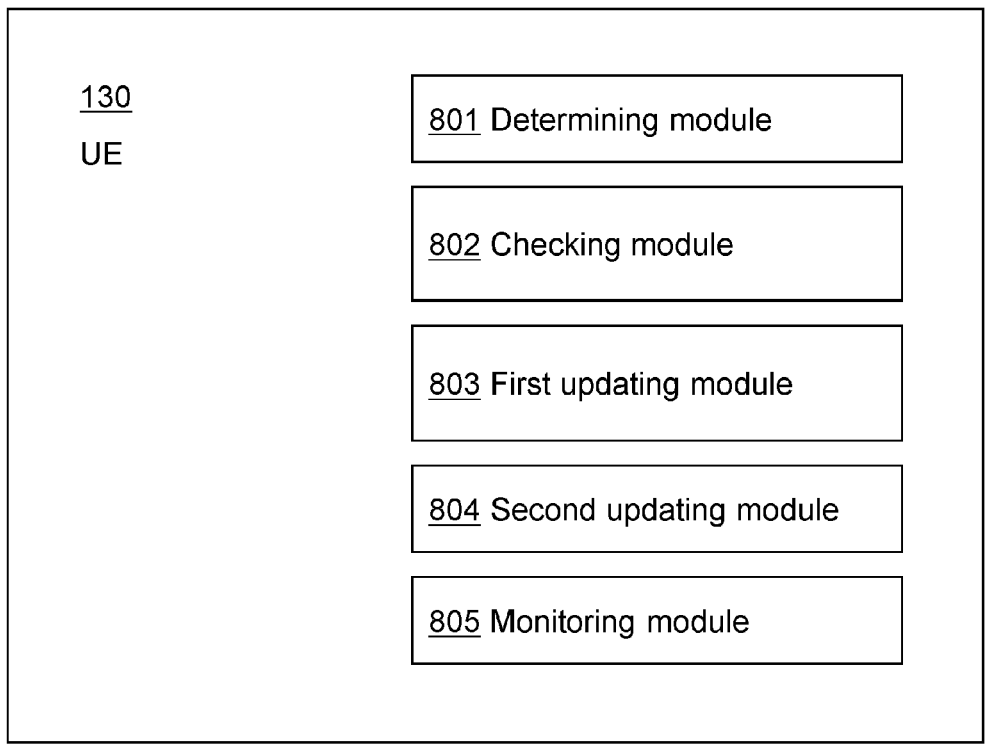
FIG. 8B is a non-limiting function block diagram of a UE for implementing the various example embodiments.

Example embodiments of the UE 130 for deciding whether to monitor a downlink control channel in a subframe will now be described, sometimes with reference to FIG. 8B.

The UE 130 operates with DRX and TDD. The UE is in an active state of a DRX cycle. The UE is configured to determine that the subframe is a fixed downlink subframe or that the subframe is a flexible subframe currently configured to operate as a downlink subframe.

In some embodiments, the UE 130 comprises a determining module 801 configured to perform the determination. The determining module 801 may be comprised in a data processor 132 of the UE 130.

In some embodiments, the UE 130 is further configured to check control signalling in order to determine whether the subframe is a flexible subframe currently configured to operate as a downlink subframe. The control signalling comprises a current configuration for the subframe. In some embodiments, the UE 130 comprises a checking module 802, configured to check the control sigalling. The checking module may be comprised in a data processor 132 of the UE 130

The UE 130 is further configured to update a first DRX timer, upon determining that the subframe is a fixed downlink subframe.

In some embodiments, the UE 130 comprises a first updating module 803, configured to update the first DRX timer. The first updating module 803 may be comprised in a data processor 132 of the UE 130. The first DRX timer may be a DRX counter 146 of the UE 130.

In some embodiments the first DRX timer is an On Duration Timer.

In some embodiments, the UE 130 is further configured to update a second DRX timer, upon determining that the subframe is a fixed downlink subframe or that the subframe is a flexible subframe currently configured to operate as a downlink subframe.

In some embodiments, the UE 130 comprises a second updating module 804, configured to update the second DRX timer. The second updating module 804 may be comprised in a data processor 132 of the UE 130. The second DRX timer may be a DRX counter 146 of the UE 130.

In some embodiments the second DRX timer is a DRX Inactivity Timer.

The UE 130 is further configured to decide to monitor the downlink control channel in the subframe, upon determining that the subframe is a fixed downlink subframe or that the subframe is a flexible subframe currently configured to operate as a downlink subframe. In some embodiments, the UE 130 comprises a monitoring module 805, configured to monitor the downlink control channel.

Various details of some possible embodiments are discussed below.

When a UE 130 considers a subframe, which may be a downlink, uplink, or flexible subframe, it may determine a current configuration for the flexible subframe as a downlink or an uplink subframe. In one example embodiment, based on the determination of the current configuration for the flexible subframe, the UE 130 decides whether to monitor a downlink control channel or to enter a sleep mode to save power. In a more specific example implementation, a UE 130, during all DRX Active Time that is not part of a configured measurement gap, monitors a cell downlink control channel, e.g., a PDCCH, during downlink and flexible subframes, but not in subframes configured for uplink transmission. For another example implementation, a UE 130 does not monitor a downlink control channel during flexible subframes unless a DRX inactivity timer is running, e.g., a drx-InactivityTimer in LTE.

In another example embodiment, the UE 130 decides whether to update, increment or decrement, one or more DRX subframe timers, towards reaching a predetermined time out value, based on the determination of the current configuration for the flexible subframe. In still other example embodiments, one or more DRX Active Time timers, e.g., onDurationTimer, drx-InactivityTimer, drx-RetransmissionTimer, only count up or down for fixed downlink subframes and not for flexible downlink subframes.

These embodiments are preferably, though not necessarily, used together.

Figure 9A:
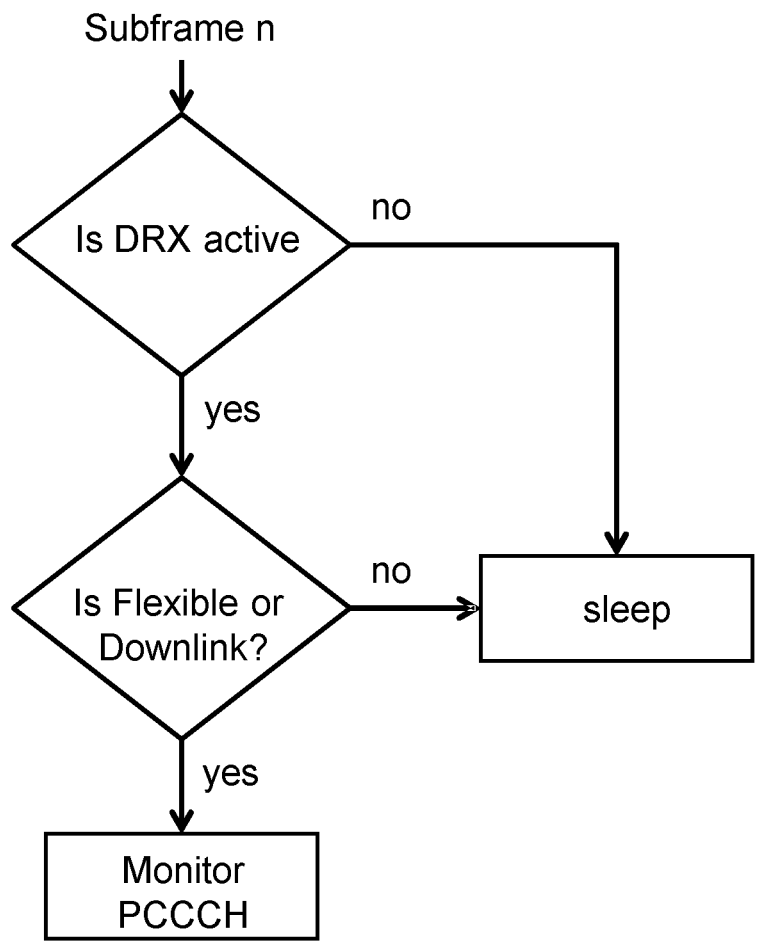
FIGS. 9A-9E are flowchart diagrams illustrating non-limiting example procedures that may be performed by a UE operating with DRX and dynamic TDD in accordance with various example embodiments.

In an example embodiment, the UE 130 monitors a downlink control channel such as a cell's PDCCH in all downlink and flexible subframes during DRX Active Times. For ease of description and not limitation, reference is made to the UE 130 monitoring a PDCCH. FIG. 9A is a flowchart showing example procedures that a UE 130 may follow to implement such an example embodiment. Typically, the UE 130 does not monitor the PDCCH in subframes used for uplink transmissions, e.g., HARQ feedback, uplink data transmissions, physical random access channel (PRACH) transmissions, or type-1-triggered sounding reference signal (SRS) transmissions.

In another example embodiment, the UE 130 monitors the PDCCH in downlink subframes during all DRX Active Time but does not monitor the PDCCH in the flexible subframes during any DRX Active Time.

Figure 9B:
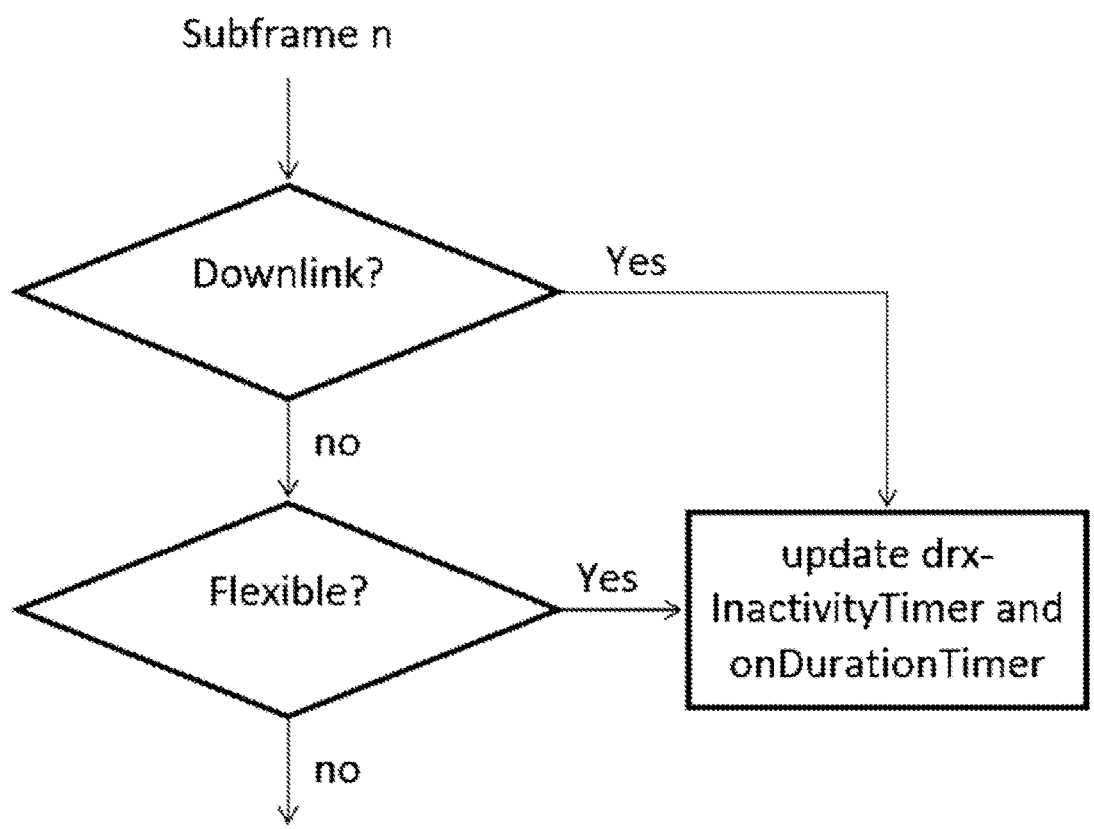

FIG. 9B is a flowchart showing example procedures that a UE 130 may follow to implement another example embodiment including DRX timer updating functionality used. The UE 130 selectively updates DRX timers such as a drx-inactivity timer and an onDuration Timer. As mentioned in the background, DRX timers are referred to as timers as in the 3GPP standard, but are implemented as counters to selectively count subframes up or down to a timeout value. In this example, only downlink subframes and flexible subframes currently configured as downlink subframes are counted by the DRX timers.

Figure 9C:
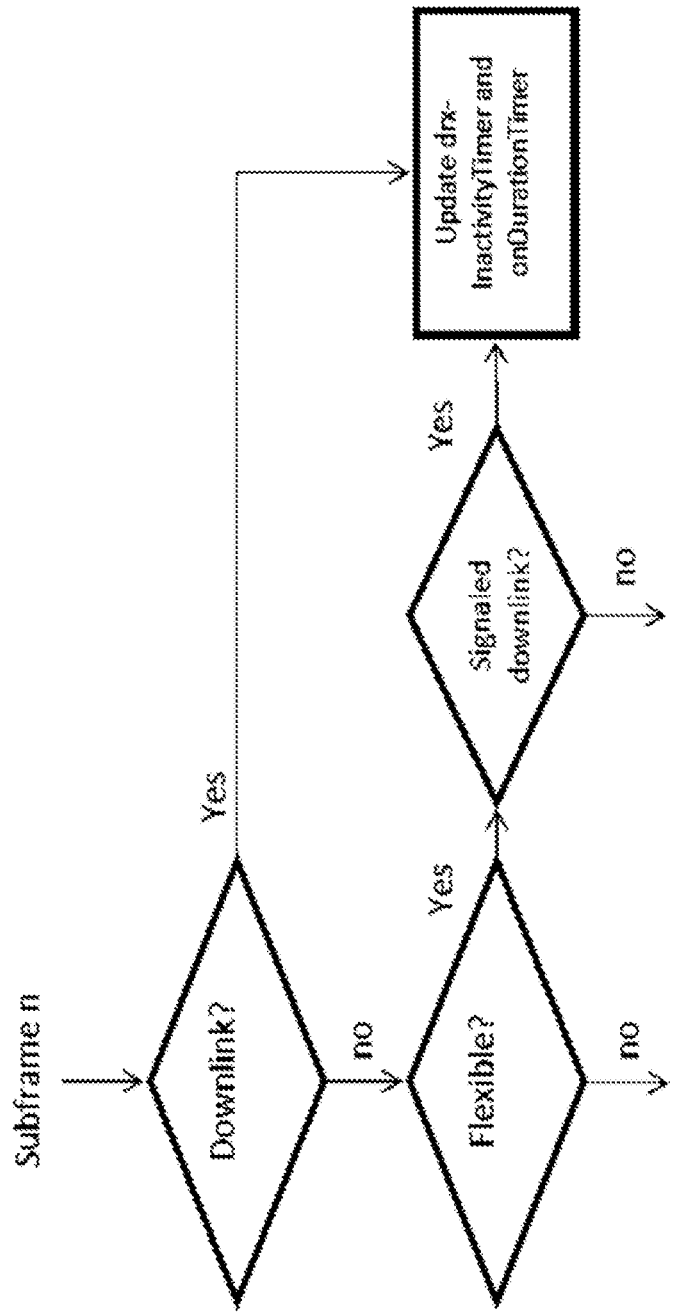

FIG. 9C shows an example embodiment which is a refinement of the procedures in FIG. 9A and also adds a further DRX timer updating functionality as in FIG. 9B. For a flexible subframe, a determination is made whether that flexible subframe is currently configured to operate as a downlink subframe. This determination may be done by checking control signaling that includes the current configuration for the flexible subframe. This way the UE 130 does not waste battery power monitoring the PDCCH during flexible subframes currently configured as uplink subframes.

Figure 9D:
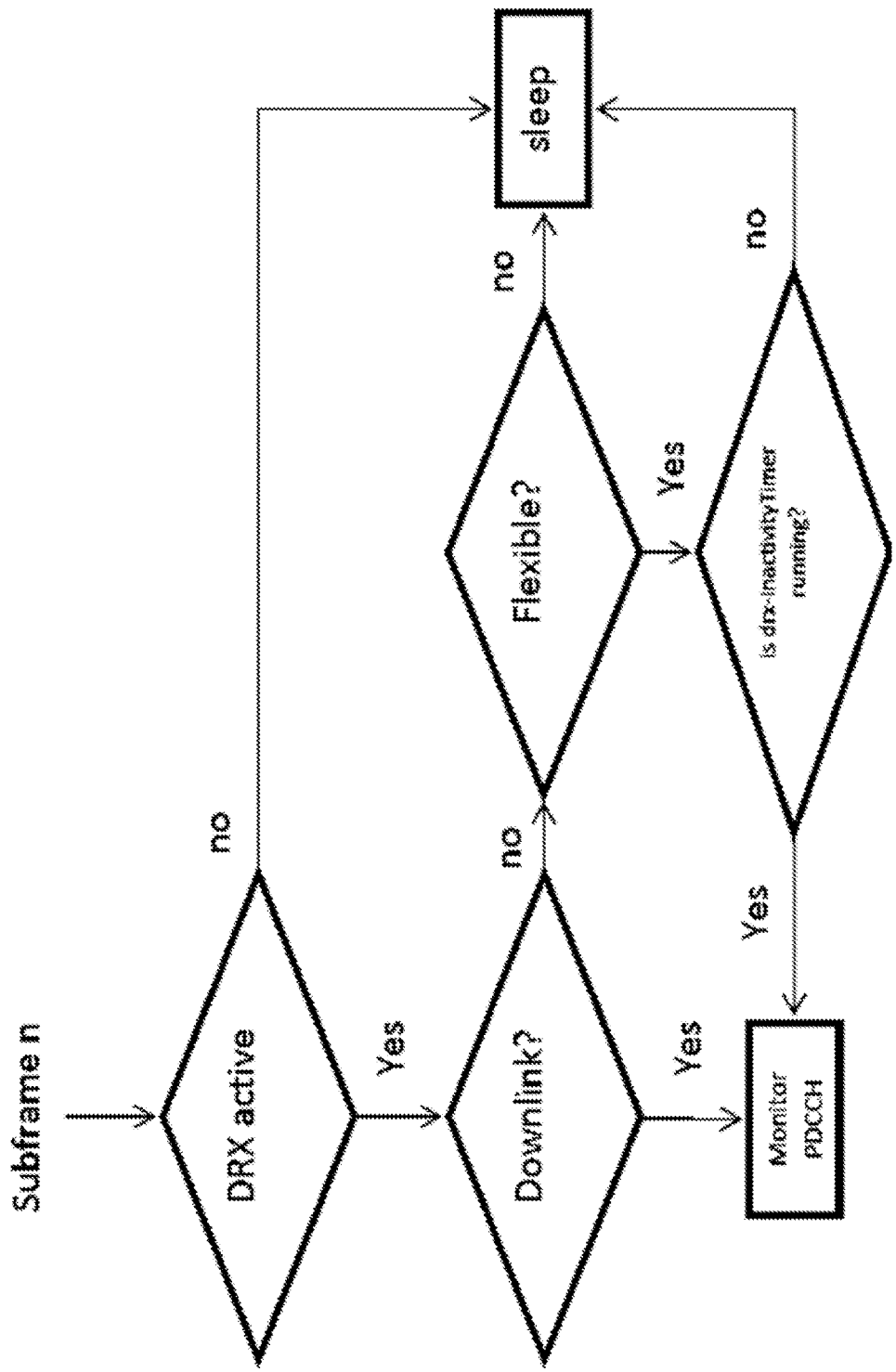

In another example embodiment, the UE 130 does not monitor the PDCCH in any, or a subset, of the flexible subframes unless certain conditions for DRX Active Time is fulfilled. For example, the UE 130 may monitor the PDCCH during flexible subframes only if a drx-InactivityTimer is running and not when only a onDurationTimer is running or a scheduling request has been sent to the base station by the UE 130. In this way, the UE 130 power consumption during OnDurationTimer is substantially reduced without losing scheduling flexibility during OnDurationTimer. The UE 130 does not need to be active in flexible subframes which might not include PDCCH. On the other hand, monitoring PDCCH during flexible subframes during drx-InactivityTimer provides scheduling flexibility. FIG. 9D is a flowchart showing an example where the PDCCH is not monitored for a flexible subframe unless the drx-InactivityTimer is running; otherwise, the UE 130 goes to sleep mode. This could be done by defining DRX Active Time differently for fixed downlink and flexible subframes, where one or more criteria for DRX Active Time for flexible subframes are a subset of the ones for fixed downlink subframes.

In some embodiments, the UE 130 monitors PDCCH in flexible subframes only if the remaining time of a specific timer is larger than a threshold. For example, the UE 130 may be required to monitor the PDCCH in a flexible subframe n if the drx-InactivityTimer expires after n+X, where X may be signaled by the network or fixed in the 3GPP standard. X may depend on the value of the drx-inactivityTimer.

In some example embodiments, the UE 130 may not be required to monitor the PDCCH in flexible subframes in-between an uplink subframe or an UpPTS subframe and a subframe scheduled for uplink transmission if the time-span does not contain a DwPTS subframe. In other words, the UE 130 does not expect a downlink subframe to be reconfigured as an uplink subframe at any other point than at a DwPTS subframe.

PDCCH monitoring can be modified either by changing the PDCCH subframe definition in the MAC specification Section 3.1 or by changing the rules when the UE 130 monitors PDCCH in the DRX Section 5.7 of TS 36.321, Release 11.2.0.

In some example embodiments, all DRX timers may be updated in all subframes where the UE 130 may be scheduled, i.e., in downlink and flexible subframes. In this way, there is no ambiguity between the UE 130 and base station DRX timers resulting from the UE 130 missing detection of flexible subframe configuration signaling for dynamic TDD. This is consistent with an assumption that a DRX Active Time spans a fixed number of possible scheduling occasions to provide the transmit scheduler with freedom to schedule the UE 130. In other example embodiments, the UE's 130 DRX timers (implemented as counters) are updated only in downlink subframes.

Figure 9E:
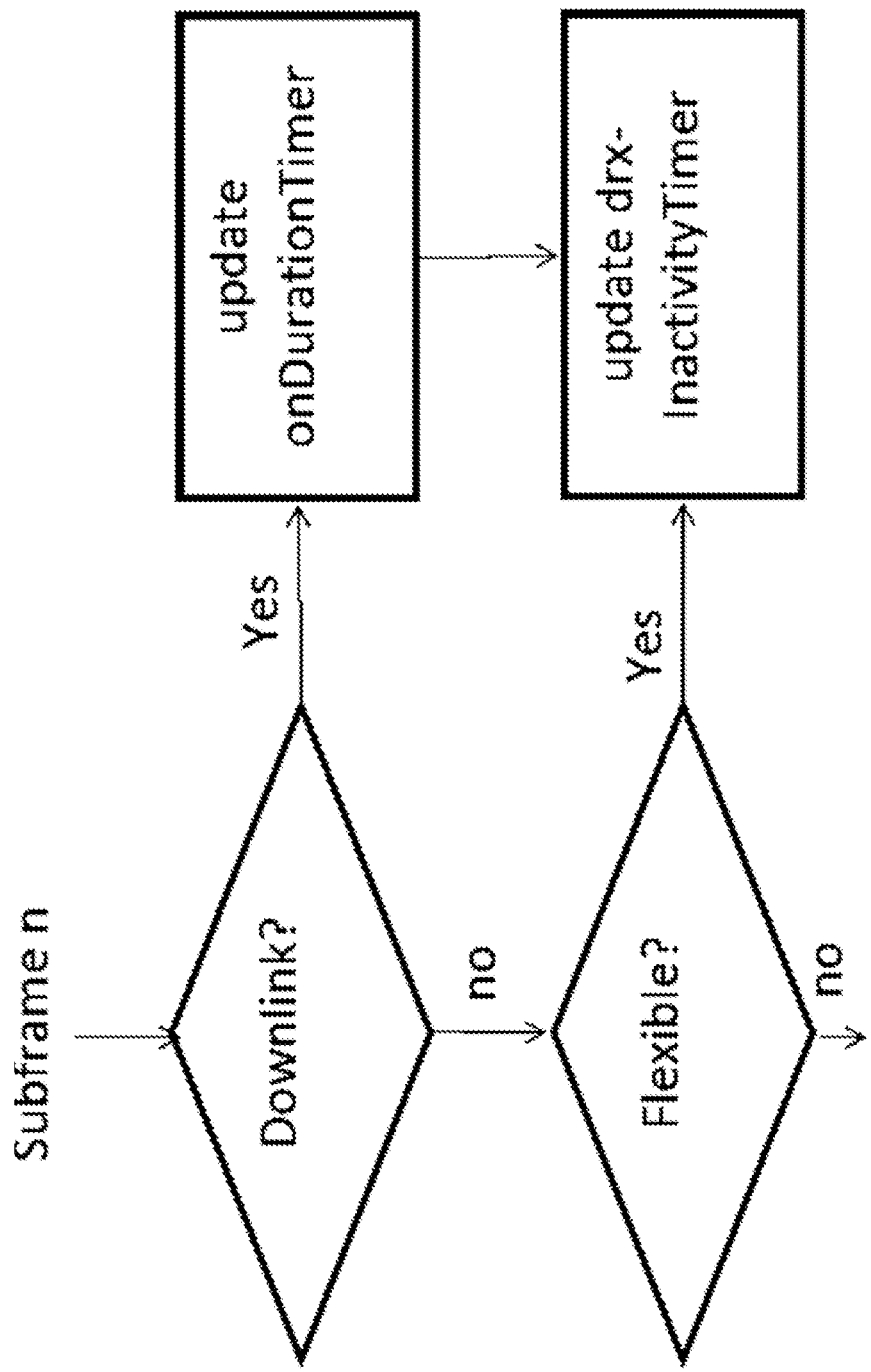

In another example embodiment illustrated in FIG. 9E, some DRX timers, implemented again as counters, are updated based on all downlink and flexible subframes, while other DRX timers are only updated in downlink subframes for example to reflect the subframes where PDCCH is actually monitored depending on different timers. In one non-limiting example, the DRX onDuration timer is only updated during downlink subframes, and the drx-InactivityTimer is updated in all downlink and flexible subframes. This provides better control from the network side because a UE 130 that is not scheduled to transmit does not need to be aware of the flexible subframes and the base station has a number of fixed downlink subframes to schedule the UE 130 which would activate the drx-Inactivity timer. The drx-InactivityTimer is only used when the UE 130 is active, where the flexible subframes may be used for scheduling.

Alternatively, the DRX counters may be updated in all subframes where the UE 130 monitors the PDCCH.

The various counting embodiments for DRX timers may be incorporated to the MAC specification TS 36.321 by changing the PDCCH-subframe definition. Alternatively, the definition may specify for each DRX timer which subframes are counted.

The technology in this application includes a number of advantages. For example, it provides a well-defined DRX behavior for UEs 130 operating with reconfigurable/dynamic TDD. Another example advantage is that the technology provides a more energy efficient way of operating a UE 130 in dynamic TDD which improves the UE's 130 battery lifetime.

Although the description above contains many specifics, they should not be construed as limiting but as merely providing illustrations of some presently preferred embodiments. Embodiments described herein may be considered as independent embodiments or may be considered in any combination with each other to describe non-limiting examples. Although non-limiting, example embodiments of the technology were described in an E-UTRAN context, the principles of the technology described may also be applied to other radio-access technologies. Indeed, the technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

In the above description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

As used herein, the term "node" and/or "network node" may encompass nodes using any technology including, e.g., high speed packet access (HSPA), long-term evolution (LTE), code-division multiple access (CDMA) 2000, GSM, etc. or a mixture of technologies such as with a multi-standard radio (MSR) node (e.g., LTE/HSPA, GSM/HS/LTE, CDMA2000/ LTE, etc). Furthermore, the technology described herein may apply to different types of nodes e.g., base station, eNode B, Node B, relay, base transceiver station (BTS), donor node serving a relay node (e.g., donor base station, donor Node B, donor eNB), supporting one or more radio access technologies, and transmit and receive points in a CoMP context.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

The invention claimed is:

1. A method in a user equipment, UE, for deciding whether to monitor a downlink control channel in a subframe, wherein the UE operates with discontinuous reception, DRX, and dynamic time division duplex, TDD, the UE being in an active state of a DRX cycle, the method comprising:
   determining that the subframe is a fixed downlink subframe if the subframe is a fixed downlink subframe and determining that the subframe is a flexible subframe currently configured to operate as a downlink subframe if the subframe is a flexible subframe currently configured to operate as a downlink subframe;
   upon determining that the subframe is a fixed downlink subframe, updating a first DRX timer towards reaching a predetermined time out value and deciding to monitor the downlink control channel in the subframe; and
   upon determining that the subframe is a flexible subframe currently configured to operate as a downlink subframe, deciding to monitor the downlink control channel in the subframe if a second DRX timer is running and not when only the first DRX timer is running.

2. The method according to claim 1, wherein the determining whether the subframe is a flexible subframe currently configured to operate as a downlink subframe comprises checking control signalling, which control signalling comprises a current configuration for the subframe.

3. The method according to claim 1, wherein the first DRX timer is an On Duration Timer.

4. The method according to claim 1, further comprising upon determining that the subframe is a fixed downlink subframe or that the subframe is a flexible subframe currently configured to operate as a downlink subframe, updating a second DRX timer towards reaching a predetermined time out value.

5. The method according to claim 4, wherein the second DRX timer is a DRX Inactivity Timer.

6. A user equipment, UE, for deciding whether to monitor a downlink control channel in a subframe, wherein the UE operates with discontinuous reception, DRX, and dynamic time division duplex, TDD, the UE being in an active state of a DRX cycle, wherein the UE is configured to:
   determine that the subframe is a fixed downlink subframe if the subframe is a fixed downlink subframe and determining that the subframe is a flexible subframe currently configured to operate as a downlink subframe if the subframe is a flexible subframe currently configured to operate as a downlink subframe;
   update a first DRX timer towards reaching a predetermined time out value and decide to monitor the downlink control channel in the subframe, upon determining that the subframe is a fixed downlink subframe; and further to
   decide to monitor the downlink control channel in the subframe, upon determining that the subframe is a flexible subframe currently configured to operate as a downlink subframe and if a second DRX timer is running and not when only the first DRX timer is running.

7. The UE according to claim 6, further being configured to
   check control signalling in order to determine whether the subframe is a flexible subframe currently configured to operate as a downlink subframe, the control signalling comprising a current configuration for the subframe.

8. The UE according to claim 6, wherein the first DRX timer is an On Duration Timer.

9. The UE according to claim 6, further configured to
   update a second DRX timer towards reaching a predetermined time out value, upon determining that the subframe is a fixed downlink subframe or that the subframe is a flexible subframe currently configured to operate as a downlink subframe.

10. The UE according to claim 9, wherein the second DRX timer is a DRX Inactivity Timer.

* * * * *